US008731059B2

(12) United States Patent
Yang et al.

(10) Patent No.: US 8,731,059 B2
(45) Date of Patent: May 20, 2014

(54) APPARATUS AND METHOD FOR CALCULATING SUM OF ABSOLUTE DIFFERENCES FOR MOTION ESTIMATION OF VARIABLE BLOCK

(75) Inventors: Yil Suk Yang, Daejeon (KR); Jung Hee Suk, Daegu (KR); Chun Gi Lyuh, Daejeon (KR); Ik Jae Chun, Daejeon (KR); Tae Moon Roh, Daejeon (KR); Jong Dae Kim, Daejeon (KR); Ki Chul Kim, Seoul (KR); Jung Hoon Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1542 days.

(21) Appl. No.: 12/105,745

(22) Filed: Apr. 18, 2008

(65) Prior Publication Data

US 2008/0292001 A1 Nov. 27, 2008

(30) Foreign Application Priority Data

May 22, 2007 (KR) .................. 10-2007-0049858
Feb. 21, 2008 (KR) .................. 10-2008-0015685

(51) Int. Cl.
*H04N 7/12* (2006.01)
*H04N 11/02* (2006.01)
*H04N 11/04* (2006.01)
*H04N 7/26* (2006.01)
*H04N 7/50* (2006.01)
*H04N 7/36* (2006.01)

(52) U.S. Cl.
CPC ... *H04N 19/00521* (2013.01); *H04N 19/00909* (2013.01); *H04N 19/00781* (2013.01); *H04N 19/00678* (2013.01); *H04N 19/00084* (2013.01); *H04N 19/00012* (2013.01); *H04N 19/00133* (2013.01)
USPC ............ 375/240.16; 375/240.12; 375/240.01; 375/240.26

(58) Field of Classification Search
CPC .................. H04N 19/00012; H04N 19/00084; H04N 19/00133; H04N 19/00521; H04N 19/00678; H04N 19/00781; H04N 19/00909
USPC ........................ 375/240.01, 240.12, 240.26
See application file for complete search history.

(56) References Cited

U.S. PATENT DOCUMENTS 5,696,836 A * 12/1997 Yoshino et al. ............... 382/107
5,838,828 A * 11/1998 Mizuki et al. ................. 382/236
7,558,428 B2 * 7/2009 Shen et al. .................... 382/236

FOREIGN PATENT DOCUMENTS

KR 1020060031478 A 4/2006
KR 1020060106490 A 10/2006

(Continued)

OTHER PUBLICATIONS

Mohammed Sayed, et al; "Towards an H.264/AVC Full Encoder on Chip: An Efficient Real-Time VBSME ASIC Chip"; IEEE International Symposium on Circuits and Systems 2006, pp. 2613-2616.

(Continued)

*Primary Examiner* — Geepy Pe
(74) *Attorney, Agent, or Firm* — Ladas & Parry LLP

(57) ABSTRACT

An apparatus that calculates a Sum of Absolute Differences (SAD) for motion estimation of a variable block capable of parallelly calculating SAD values with respect to multiple current frame macroblocks at a time is presented. The apparatus includes a PE array unit including at least one Processing Element (PE) that is aligned in the form of a matrix, and parallelly calculating a SAD value of at least one pixel provided in multiple serial current frame macroblocks, a local memory including current frame macroblock data, reference frame macroblock data, and reference frame search area data, and transmitting the data to each PE that is provided in the PE array unit, and a controller for making a command for the data that are provided in the local memory to be transmitted corresponding to at least one pixel, on which each PE provided in the PE array unit performs calculation.

17 Claims, 13 Drawing Sheets

(56) References Cited

FOREIGN PATENT DOCUMENTS

| KR | 1020070036285 | 4/2007 |
|----|---------------|--------|
| KR | 10-0716308 B1 | 5/2007 |

OTHER PUBLICATIONS

Jae Hun Lee, et al; "Variable Block Size Motion Estimation Algorithm and its Hardware Architecture for H.264/AVC"; Circuits and Systems, 2004. ISCAS '04. Proceedings of the 2004 International Symposium on; May 23-26, 2004; vol. 3, pp. III-741-III-744.

* cited by examiner

FIG. 10
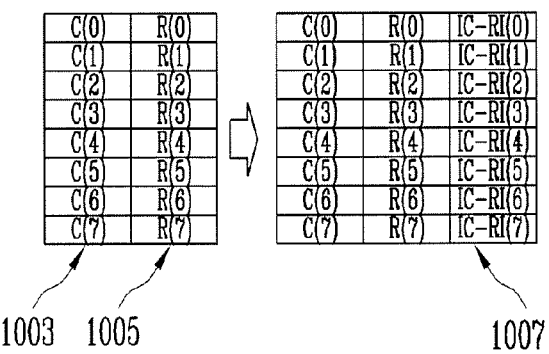
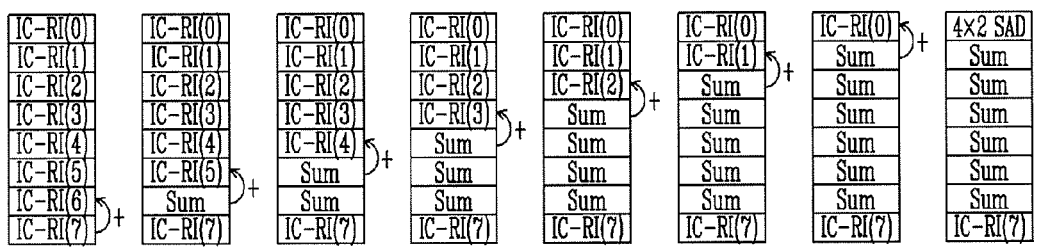

APPARATUS AND METHOD FOR CALCULATING SUM OF ABSOLUTE DIFFERENCES FOR MOTION ESTIMATION OF VARIABLE BLOCK

CROSS-REFERENCE TO RELATED APPLICATION

This application claims priority to and the benefit of Korean Patent Application No. 2007-49858, filed May 22, 2007 and Korean Patent Application No. 2008-15685, filed Feb. 21, 2008 the disclosure of which is incorporated herein by reference in its entirety.

BACKGROUND

1. Field of the Invention

The present invention relates to an apparatus and method for calculating a Sum of Absolute Differences (SAD) for motion estimation of a variable block.

The present invention relates to motion compensation used for image data compression, and more particularly, to a method of detecting in parallel a motion vector with respect to a variable block size.

The present invention is derived from a project entitled "Elements and Module for Ubiquitous Terminal [2006-S-006-02]" conducted as an IT R&D program for the Ministry of Information and Communication/Institute for Information and Technology Advancement (Republic of Korea).

2. Discussion of Related Art

H.264/AVC exhibits a higher compression rate than a previous compression standard, and may lower a data transmission rate up to 50% or greater compared with MPEG-4. However, with the use of a new technique developed to achieve a higher compression rate, calculation can be increased up to 16 times greater than MPEG-4.

The basic processing unit of H.264/AVC image compression standard is a macroblock with a block size of 16×16 pixels. Macroblock data is encoded into differential data and a motion vector through intra prediction and inter prediction, and the encoded data are transmitted. Here, the smaller the size of a unit block used for motion estimation becomes, the more accurate the prediction. However, in this case, motion vector data should be encoded per block, and this results in increased encoding processes.

Due to the relationship between the accuracy of prediction and the encoding processes, a method of using an optimal macroblock size among various macroblock sizes has been introduced in H.264/AVC. In MPEG-2, fixed-size macroblocks of 16×16 were used, and in MPEG-4, two types of macroblocks of 16×16 and 8×8 were used. But, in H.264, 7 types of macroblocks are of 16×16 to 4×4 are used.

When various sizes of macroblocks are used in the motion estimation method, the degree of screen compression may be increased, and the amount of calculation is increased as well. In particular, the motion estimation process takes the largest amount of calculation in H.264 encoding calculation, and thus a method that can efficiently process the calculation is required.

SUMMARY OF THE INVENTION

The present invention is directed to an apparatus and method for calculating a Sum of Absolute Differences (SAD) for motion estimation of a variable block.

The present invention is also directed to an apparatus and method for calculating a SAD capable of parallelly performing the SAD calculation in parallel to provide efficient and fast SAD calculation.

One aspect of the present invention provides a SAD calculator for motion estimation of a variable block, including: a PE array unit including at least one Processing Element (PE) that is aligned in the form of a matrix, and parallelly calculating a SAD value of at least one pixel provided in a plurality of serial current frame macroblocks; a local memory including current frame macroblock data, reference frame macroblock data, and reference frame search area data, and transmitting the data to each PE that is provided in the PE array unit; and a controller for making a command for the data that are provided in the local memory to be transmitted corresponding to at least one pixel, on which each PE provided in the PE array unit performs calculation.

The PE may be a basic unit that calculates a SAD value of at least one pixel provided in the current frame macroblock. Also, the PE array unit, in which the PE consists of 4 rows and 24 columns, may calculate a SAD value with respect to a pixel provided in each different current frame macroblock of every 8 columns out of the 24 columns.

Also, the PE may include: a receiver for receiving macroblock data, reference frame macroblock data, and reference frame search area data from the local memory; a register for storing the data received from the receiver; and an Arithmetic Logic Unit (ALU) for calculating the SAD using the stored data. The PE array unit may divide the PE that is provided in the PE array unit into at least four (4) sections, and perform a partitioned Single Input Multiple Data (SIMD) stream calculation on each section. The PE of the PE array unit may calculate the SAD using 4×2 pixel data of the current frame macroblock data and of the reference frame macroblock data, which are provided in the local memory. The PE array unit may calculate a SAD value of the variable block by adding up each SAD value stored in each PE to correspond to a variable block size.

Another aspect of the present invention provides a method of calculating a SAD for motion estimation of a variable block, including: storing current frame macroblock data, reference frame macroblock data, and reference frame search area data in a local memory in a PE array; storing pixel data of a reference frame macroblock and pixel data of a current frame macroblock, which correspond to each PE in the PE array, in a register in the PE; calculating a SAD of a pixel corresponding to each PE using the pixel data of the reference frame macroblock and the pixel data of the current frame macroblock, which are stored in each PE; and calculating a SAD of a variable block using the calculated SAD of each PE, wherein the PE array parallelly calculates SAD values with respect to a plurality of current frame macroblocks.

The PE may be a basic unit that calculates a SAD value of at least one pixel provided in the current frame macroblock.

The PE array, in which the PE consists of 4 rows and 24 columns, may calculate a SAD value of a pixel provided in each different current frame macroblock of every 8 columns out of the 24 columns. The SAD value of the current frame macroblock may be calculated while shifting by one pixel in a rightward direction from upper-left to lower-right in the reference frame search area. Also, the PE array may divide PEs provided in the PE aray into at least 4 sections, and perform partitioned SIMD calculation on each section. Each PE in the PE array may calculate the SAD using 4×2 pixel data of the current frame macroblock data and the reference frame macroblock data, which are provided in the local memory. The variable block may have block sizes of 4×4, 4×8, 8×4, 8×8, 16×8, 8×16, and 16×16 pixels.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 10 illustrates a method of calculating a SAD of a 4×2 pixel in each PE according to the present invention;

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

A method and apparatus for calculating a Sum of Absolute Differences (SAD) for motion estimation of a variable block according to the present invention will be described below with reference to the accompanying drawings.

Figure 1:
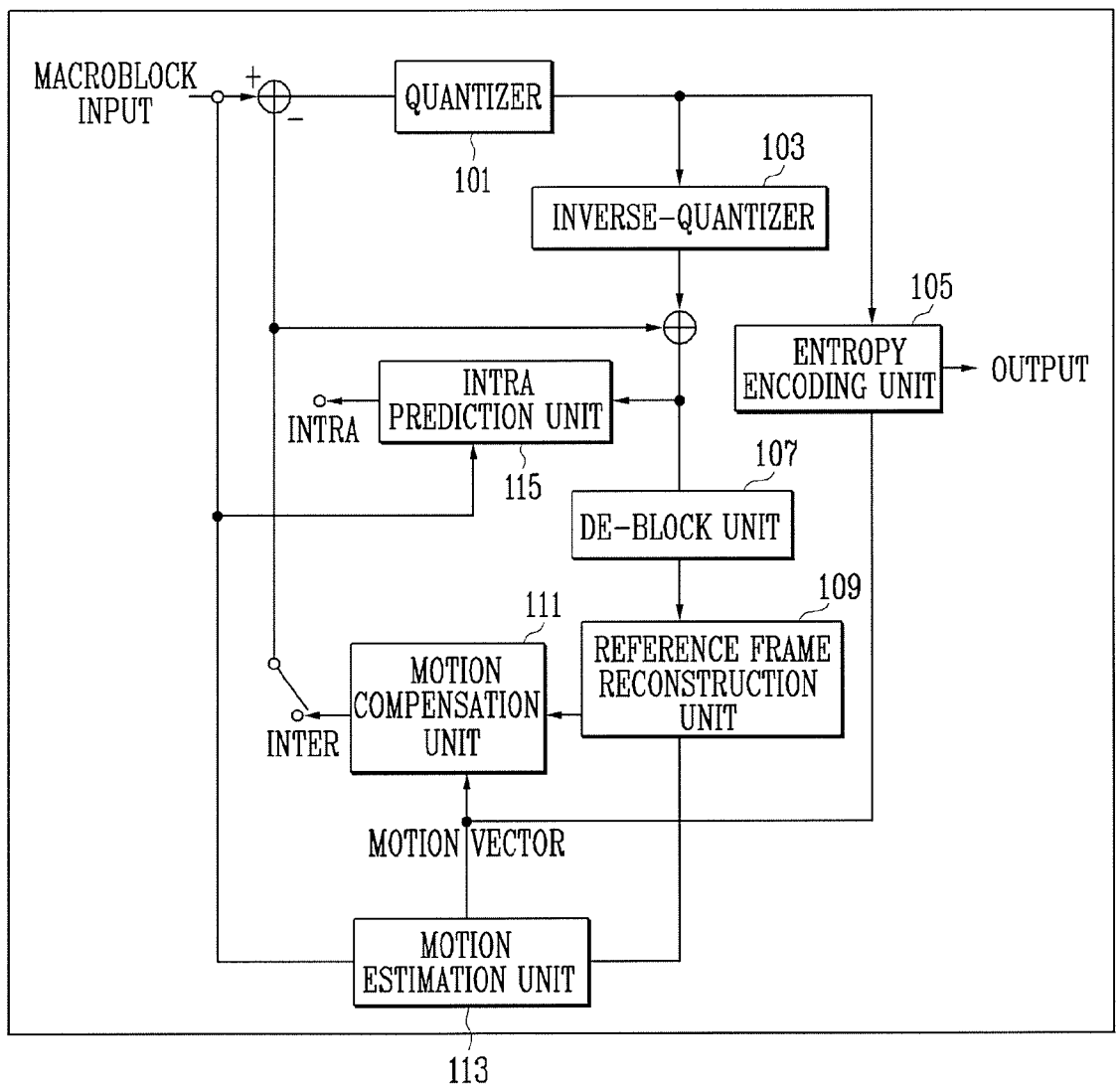
FIG. 1 is a block diagram illustrating an H.264 encoding method according to the present invention.

FIG. 1 is a block diagram illustrating a H.264 encoding method according to the present invention.

Referring to FIG. 1, a H.264 encoding device of the present invention includes a quantizer 101, a inverse-quantizer 103, an entropy encoding unit 105, a de-block unit 107, a reference frame reconstruction unit 109, a motion compensation unit 111, a motion estimation unit 113, and an intra prediction unit 115.

The quantizer 101 converts a macroblock externally input according to a predetermined method, and quantizes the converted results. An example of an image conversion method that may be used by the quantizer 101 to quantize is Discrete Cosine Transform (DCT).

The inverse-quantizer 103 is in charge of receiving the quantized image data that is converted by the quantizer 101 to inversely quantize and inversely transform the received results.

The entropy encoding unit 105 functions to perform entropy encoding on the final macroblock where the final H.264 encoding operation is performed to generate an output bit stream.

The de-block unit 107 functions to de-block from the dequantized macroblock to provide a clear image.

The reference frame reconstruction unit 109 functions to generate and store a plurality of reference frame images using the image received from the block release unit 107. The reference frames are a plurality of frame images that are used as a reference screen when motion estimation or motion compensation is made.

The motion compensation unit 111 functions to compensate for a macroblock based on the reference frame stored in the reference frame reconstruction unit 109, and the motion vector and the SAD, which are estimated by the motion estimation unit 113.

The motion estimation unit 113 functions to estimate motion of a current macroblock using the reference frame stored in the reference frame reconstruction unit 109 to calculate its motion vector and costs thereof. Because the motion estimation unit 113 must compare the macroblock of the reference frame with the macroblock of the current frame in units of pixel to perform motion estimation with respect to various blocks, the amount of calculation may be enormous.

The intra prediction unit 115 functions to perform prediction encoding in a macroblock, i.e., intra prediction, using the reference frame stored in the reference frame reconstruction unit 109.

Figure 2:
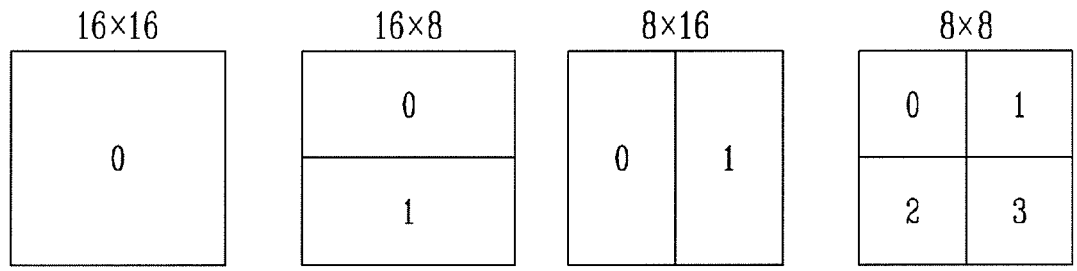
FIG. 2 illustrates types of variable blocks that are calculated in motion estimation of the H.264 encoding device according to the present invention.

FIG. 2 illustrates the types of variable blocks that are calculated in motion estimation of a H.264 encoding device according to the present invention.

Referring to FIG. 2, 7 blocks including 16×16, 8×16, 16×8, 8×8, 4×8, 8×4, and 4×4 may be used as the variable block for the motion estimation in the H.264 method. The variable block is determined depending on the SAD calculation of a current frame macroblock and a reference frame macroblock, and macroblocks of various sizes are used, so that more efficient image compression may be realized. However, the SAD calculation should be performed on all of the 7 blocks, and this results in increased amount of time and calculation required in motion estimation.

Figure 3:
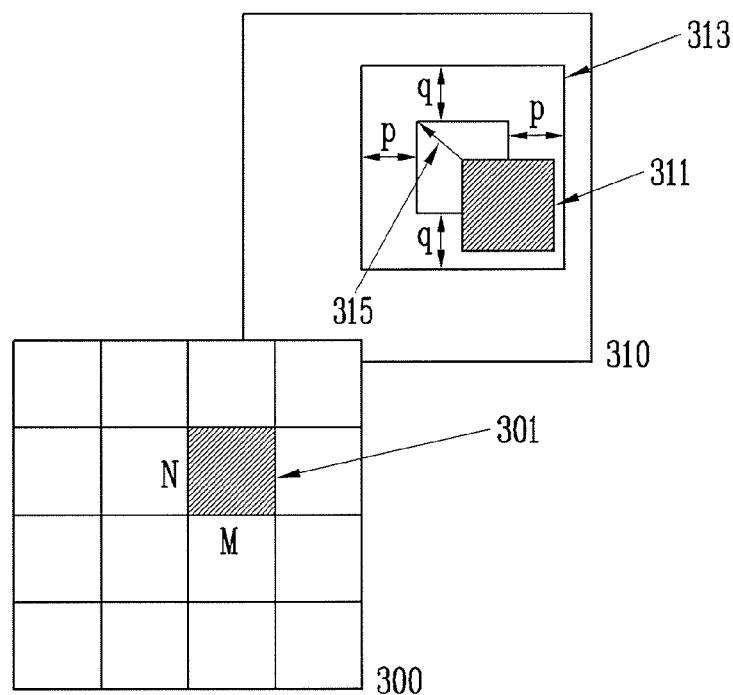
FIG. 3 illustrates a motion estimation method in the H.264 encoding method according to the present invention.

FIG. 3 illustrates a motion estimation method in the H.264 encoding method according to the present invention.

Referring to FIG. 3, a macroblock 301 of a current frame 300 to be encoded is compared with a reference frame macroblock 311 that is disposed at the same location as the macroblock 301 of the current frame in a reference frame 310 to be compared with the current frame, so that a motion vector 315 can be obtained.

Here, the reference frame macroblock 311 moves pixel by pixel within a preset search scope 313 of the reference frame 310, and compares with the current frame macroblock 301 to locate a position showing the lowest comparison value. Here, each SAD value is subject to the comparison, and the comparison method can be represented by the following equation:

$$SAD(m, n) = \sum_{i=1}^{N} \sum_{j=1}^{N} |C(i, j) - R(i+m, j+n)|$$

given $p \leq m, n \leq q$

Here, p and q denote the lengths of a row and a column of a search area, C(i,j) denotes a coordinate of an internal pixel of the current frame macroblock 301, and R(i+m, j+n) denotes a coordinate of an internal pixel in the reference frame macroblock 311 to be compared with a coordinate of the current frame macroblock 301.

When a SAD value for each pixel in the current frame macroblock 301 is calculated, a coordinate of the reference frame macroblock, which has the lowest SAD value between the current frame macroblock 301 and the reference frame macroblock 311 is calculated, and the coordinate of the reference frame macroblock may be a motion vector 315.

Figure 4:
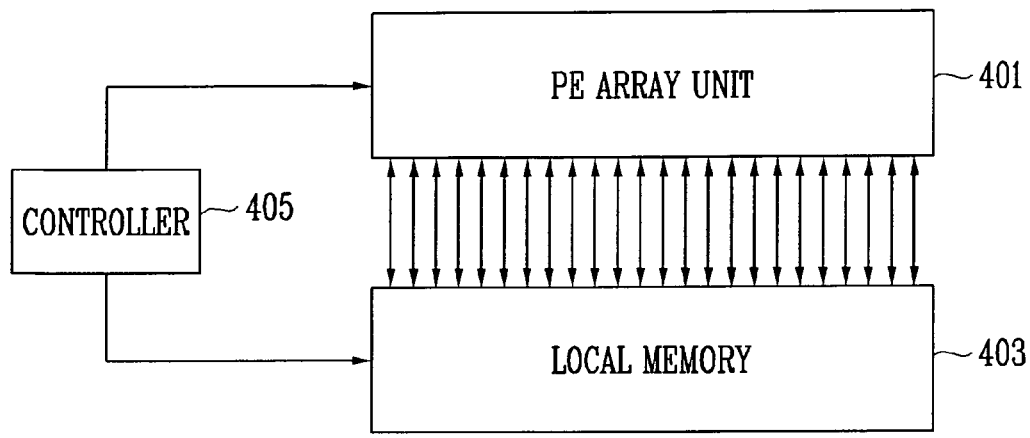
FIG. 4 schematically illustrates the configuration of a SAD calculator for SAD calculation according to the present invention.

FIG. 4 schematically illustrates the configuration of a SAD calculator for SAD calculation according to the present invention.

Referring to FIG. 4, only an essential part among parts for the SAD calculation is illustrated in the drawing. In the present invention, the part for calculating a SAD is referred to as a Processing Element (PE), and the least unit of SAD calculation is performed within the PE. The configuration of the PE will be described in detail below with reference to FIG. 6.

A PE array unit 401 is a part where the above-described PE is aligned in a matrix form. The PE array unit 401 includes at least a PE capable of performing the SAD calculation on one macroblock at a time. That is, when a PE that is capable of performing the SAD calculation on 4×2 pixels, the PE array unit must include 4×8 PEs in order to calculate a macroblock of 16×16 pixels at a time.

In the present invention, the SAD calculation can be parallelly performed on at least three (3) macroblocks, and thus 4×24 PEs may be included.

A local memory 403 stores current frame macroblock data, reference frame macroblock data, and reference frame search area data, which the PE array unit 401 requires for the SAD calculation, provides each data to the PE array unit at the request of the PE array unit 401, and stores the results.

The local memory 403 is memory-mapped to each PE of the PE array unit 401, and when the location of the reference frame macroblock that is compared along the search area is changed, the local memory provides block data that is required for the corresponding pixel to the PE array unit 401 again.

A controller 405 functions to control the SAD calculation of each PE for calculation of the current frame macroblock. That is, as illustrated in FIG. 3, when a current frame macroblock size is 16×16, the SAD calculation with respect to the current frame macroblock should be performed with the reference frame macroblock data in units of pixel. In other words, the number of reference frame macroblocks that are compared with one current frame macroblock becomes 256. Therefore, the reference frame macroblock data to be changed should be provided to the PE array unit 401, and the controller 405 controls this.

Figure 5:
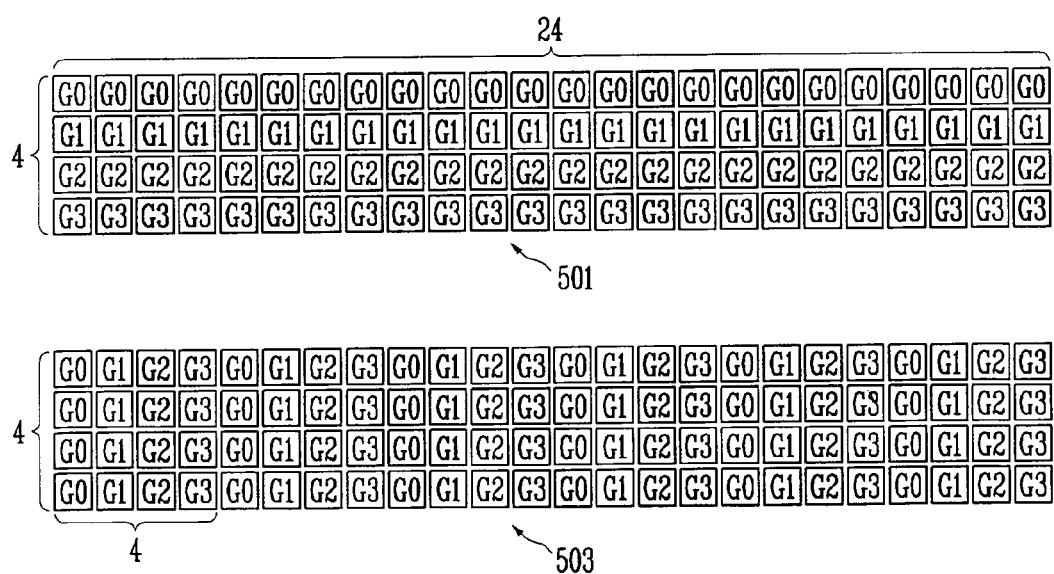
FIG. 5 illustrates a PE array of a PE array unit and a simultaneous calculation method according to the present invention.

FIG. 5 illustrates a PE array of a PE array unit and a parallel calculation method according to the present invention.

Referring to FIG. 5, the PE array unit according to the present invention includes 4×24 PEs.

In this case, the PE array unit operates in a single input stream multiple data stream (SIMD) method. That is, pluralities of PEs operate with respect to a single data stream. Therefore, all PEs can be controlled in parallel by one command. Meanwhile, as confirmed in the drawings, G0, G1, G2 and G3 processes may be separately performed on some operations, respectively. These operations are referred to as partitioned SIMD. The partitioned SIMD may be partitioned in a unit of a row as reference numeral 501, or may be separated in a unit of a 4×4 block to operate as shown in reference numeral 503.

Each PE that is capable of performing the SAD calculation on 4×2 pixels when operating as above is capable of performing the SAD calculation on one macroblock (16×16) using a 4×8 PE array. Therefore, the PE array unit having 4×24 PEs can perform the SAD calculation on three (3) macroblocks.

Figure 6:
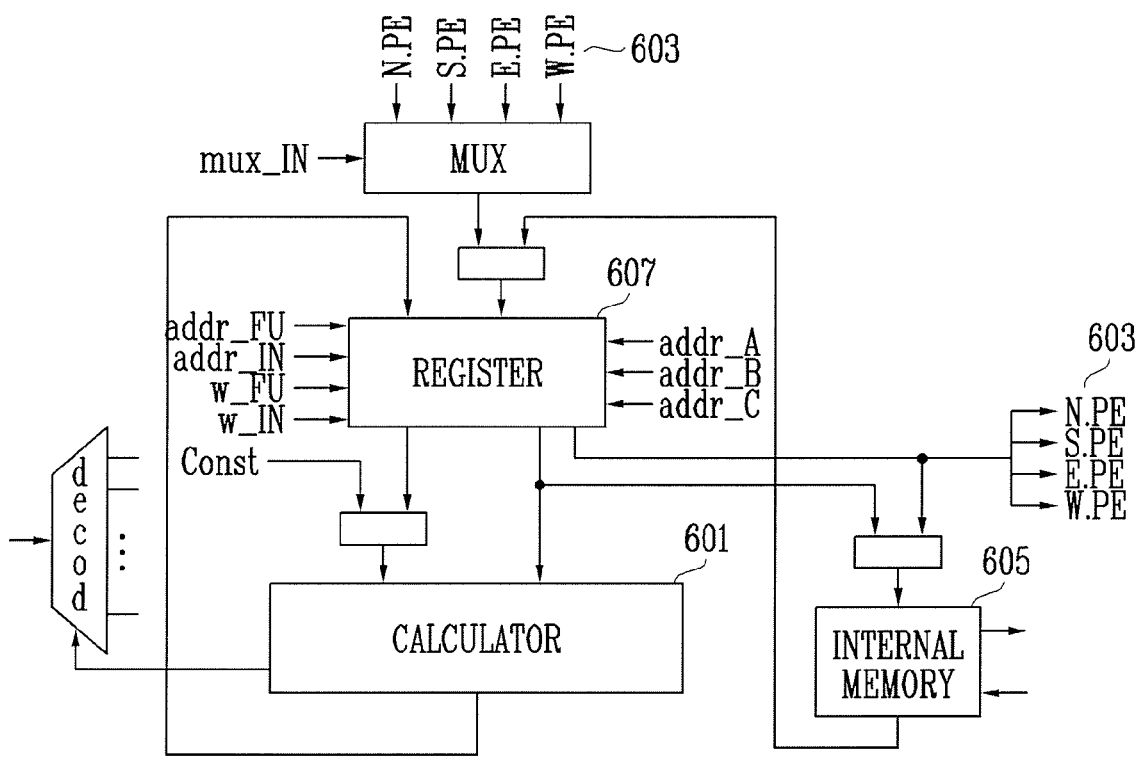
FIG. 6 is a block diagram illustrating the detailed configuration of a PE according to the present invention.

FIG. 6 is a block diagram illustrating the detailed configuration of a PE according to the present invention.

Referring to FIG. 6, the PE according to the present invention a calculator 601, an input/output unit 603, an internal memory 605 and a register 607.

The PE calculator 601 is the most essential part in the present invention, and performs the SAD calculation using current frame macroblock data and reference frame macroblock data, which are input into the register 607. The calculator 601 includes a shifter, a multiplier, and an arithmetic logic unit.

The input/output unit 603 receives calculation results and data from a PE adjacent to the PE unit, and externally outputs the calculation results and data. This is because while the PE is a calculation unit part, sometimes it receives and processes calculation results or data of an adjacent PE when continual SAD calculation is performed.

The internal memory 605 stores the current frame macroblock data and the reference frame macroblock data, which are transmitted to an external local memory. The local memory is memory-maped to the PE, and data information of a pixel to be calculated by a PE among macroblock data is provided. For this purpose, the internal memory stores data transmitted from the local memory.

Figure 7:
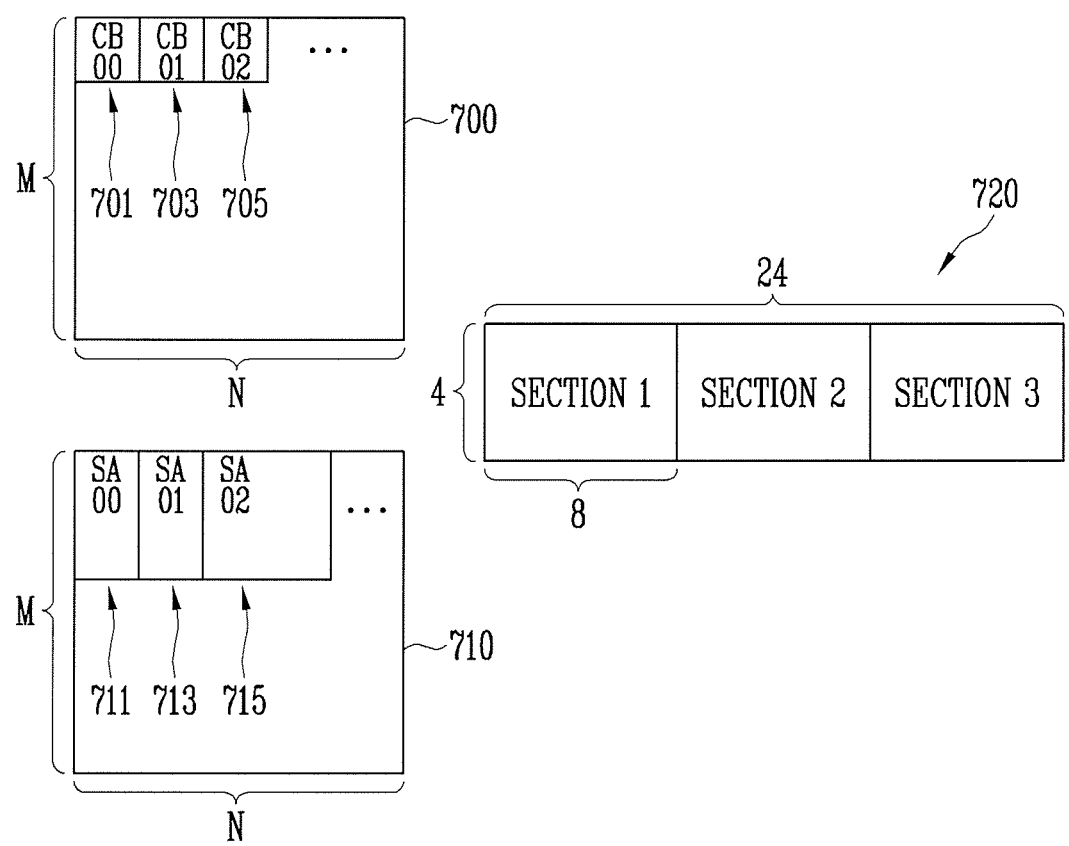
FIG. 7 schematically illustrates a method of performing the SAD calculation according to the present invention.

FIG. 7 schematically illustrates a method of performing the SAD calculation according to the present invention.

Referring to FIG. 7, in order to select macroblocks 701, 703 and 705 in a current frame 700, and obtain SAD values of the macroblocks, search areas 711, 713 and 715 according to each macroblock are designated, so that the SAD calculation is parallelly performed on the three (3) macroblocks.

In the SAD calculation, a PE array existing in a PE array unit 720 is divided into three (3) sections, and each divided section is in charge of performing the calculation on each macroblock. For example, when the PE array unit consists of 4×24 PEs, the PE array unit is divided into three (3) sections, each of which has a 4×8 array, and each 4×8 section performs the SAD calculation on one macroblock.

In this case, as shown in reference numeral 710, the search areas 711, 713 and 715 overlap. The search area is an area in which a macroblock performs calculation by moving a reference frame macroblock for the SAD calculation. For example, a reference area with respect to a macroblock having the 16×16 pixel size has a size of 31×31. Therefore, in general, while the size of a reference area with respect to the three (3) macroblocks is 31×93, the size of a reference area of the present invention is 31×63, so that the size of the reference area is reduced to ⅔ of the general reference area. Accordingly, when the SAD calculation is performed by a PE, the amount of data that is to be transferred from a local memory is reduced to ⅔ of the conventional method, and its processing time is reduced as well.

Figure 8:
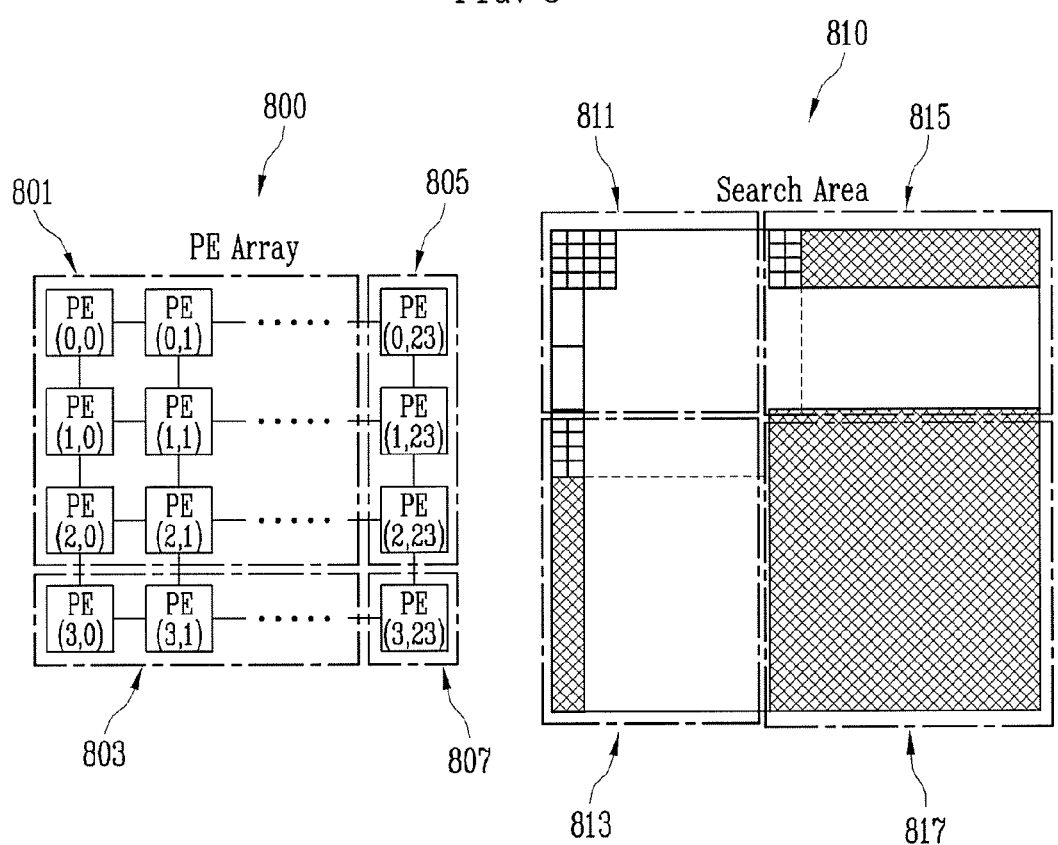
FIG. 8 illustrates memory mapping of a PE array unit to a search area according to the present invention.

FIG. 8 illustrates memory mapping of a PE array unit to a search area according to the present invention.

Referring to FIG. 8, reference numeral 800 schematically illustrates a PE array unit, and reference numeral 810 illustrates a reference frame search area corresponding to the PE array unit.

The PE array unit 800 consists of 4×24 PEs as described with reference to FIG. 7. The PE array unit 800 parallelly performs the SAD calculation on three (3) current frame macroblocks. That is, 4×24 PEs parallelly perform calculation on the current frame blocks of the 16×(16+16+16) pixel size.

Therefore, each PE in the PE array unit 800 performs the SAD calculation on 4×2 pixels of the current frame macroblock per PE. Accordingly, the current frame macroblock is sequentially mapped to a 4×2 pixel block and each PE included in the PE array unit 800 to be stored in the local memory.

Meanwhile, the reference area has the 31×63 pixel size. Therefore, a method of mapping the reference area to a memory is different from that of the current frame macroblock to the memory, and it will be described below. First, in the PE array unit, PEs in an area 801 are mapped to a 4×2 pixel block like the current frame macroblock. This is because the reference frame macroblock that is compared with the current frame macroblock must be input in the same size for the SAD calculation. This is illustrated in reference numeral 811.

In addition, PEs in an area 803 are mapped to 19×2 pixel data in order to continuously provide reference frame block data even when the reference frame macroblock moves. Furthermore, PEs in an area 805 are mapped to 4×17 pixel data to provide data even when the reference frame macroblock moves. Finally, a PE in an area 807 is mapped to all of 19×17 pixel data to be stored in order to store the remaining search area.

When the entire search area is stored in the local memory, and each PE is mapped to the search area, the SAD calculation can be performed using the mapped search area without additionally transmitting and receiving data to and from an external memory. In this case, while time to store or update data between the local memory and the PE is required, since the data is stored or updated in the process of performing the SAD calculation by the PE, there is no substantial time delay.

Figure 9:
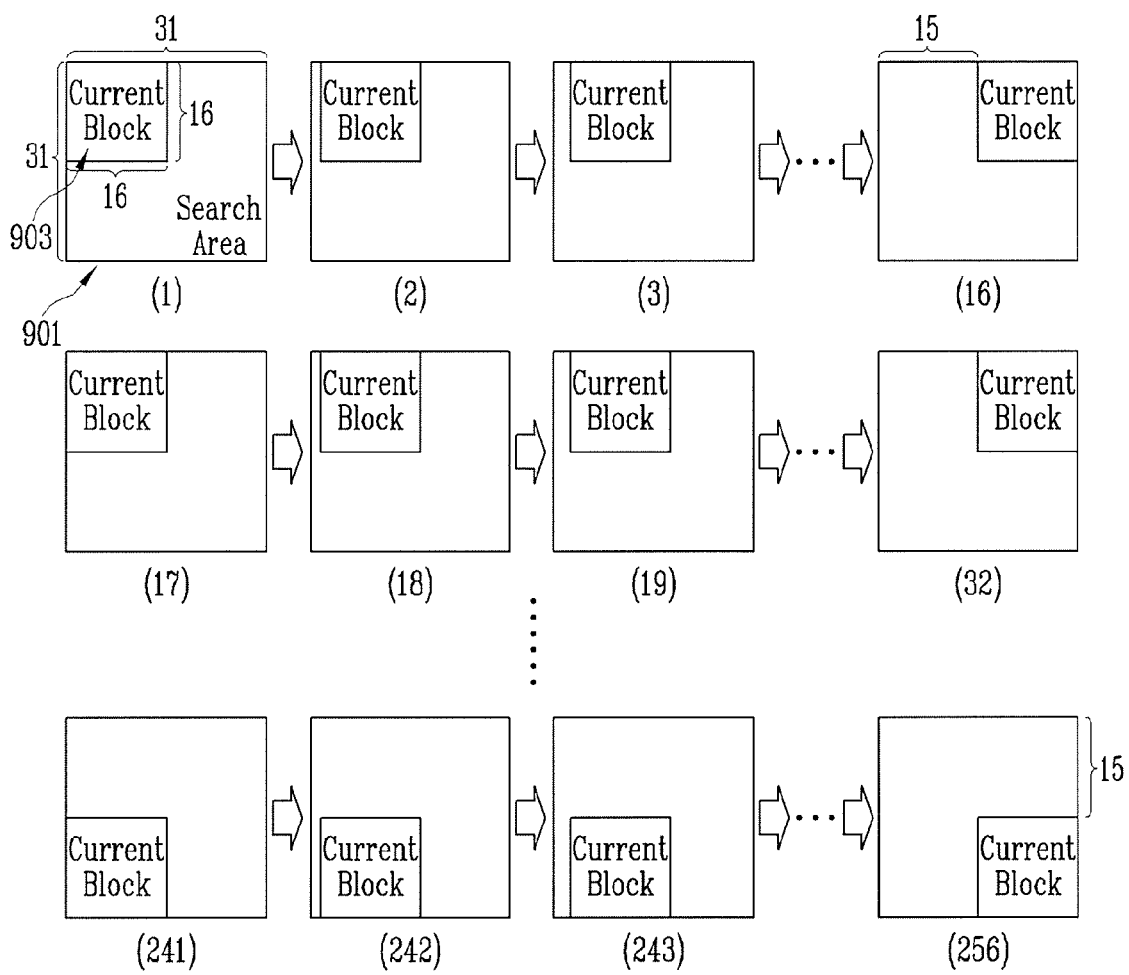
FIG. 9 illustrates a pre-process for the SAD calculation according to the present invention.

FIG. 9 illustrates a pre-process for the SAD calculation according to the present invention.

Referring to FIG. 9, it is illustrated how a current frame macroblock 903 moves within a reference frame search area 901 to calculate a SAD.

As described in the previous drawings, the SAD calculation is performed by comparing the degree of similarity between the current frame macroblock 903 and a reference frame macroblock at the same position as the current frame macroblock in a previously obtained reference frame. In this case, since the degree of similarity between one macroblock and each macroblock in the search region 901 must be compared, one current frame macroblock moves the search region 901 by one pixel to perform the SAD calculation on the entire area as illustrated in FIG. 9. As confirmed in FIG. 9, the SAD calculation is performed by moving by one pixel from an upper-left side to a lower-right side of the search area 901.

To perform the SAD calculation, all data required for the calculation must be transferred from the local memory of the PE array unit, which substantially performs the SAD calculation, to a register of the PE. This process is performed only when one row of the current frame macroblock is shifted, and is performed in steps (1), and (17) . . . (241) in the drawing. Therefore, the process is performed 16 times through the entire search area.

In particular, when step (1) is performed, each PE of the PE array unit, which corresponds to one macroblock, transfers 4×2 pixel data information of the current frame macroblock and its corresponding 4×2 pixel data information of the reference frame macroblock to each PE register.

Afterwards, since the current frame macroblock data is already transferred in step (1), only pixel data of the reference frame macroblock that is changed according to the row shift is transferred in steps (7) to (241).

FIG. 10 illustrates a method of calculating a 4×2 pixel SAD in each PE according to the present invention.

Referring to FIG. 10, as illustrated in FIG. 9, each PE can store all pixel data of the current frame macroblock and all pixel data of the reference frame search area.

Reference numeral 1001 illustrates a method of calculating the SAD of each pixel with respect to 4×2 pixels, i.e., 8 pixels in each PE. As illustrated in reference numeral 1001, when each pixel value (1003) of the current frame macroblock and each pixel value (1005) of the reference frame macroblock are stored, an absolute value of a difference between pixel values at the same position in each macroblock is calculated to be stored (1007). The absolute value of the difference between the pixel values is the SAD value.

Reference numeral 1010 illustrates a method of calculating a SAD value of a 4×2 block. The SAD value that is calculated in reference numeral 1001 is obtained by adding each pixel SAD value (1007) from the bottom to be stored in a higher memory, and the stored value is added to the next pixel value, so that added results are stored in a higher memory. Accordingly, a value that finally remains on the top of the memory becomes the SAD value of the 4×2 block.

In conclusion, each PE calculates the SAD value with respect to the 4×2 block that each PE processes, and when the SAD value is calculated in the entire reference frame search area using the same method as described in FIG. 9, the SAD value with respect to the 4×2 block in the entire area can be calculated.

Figure 11:
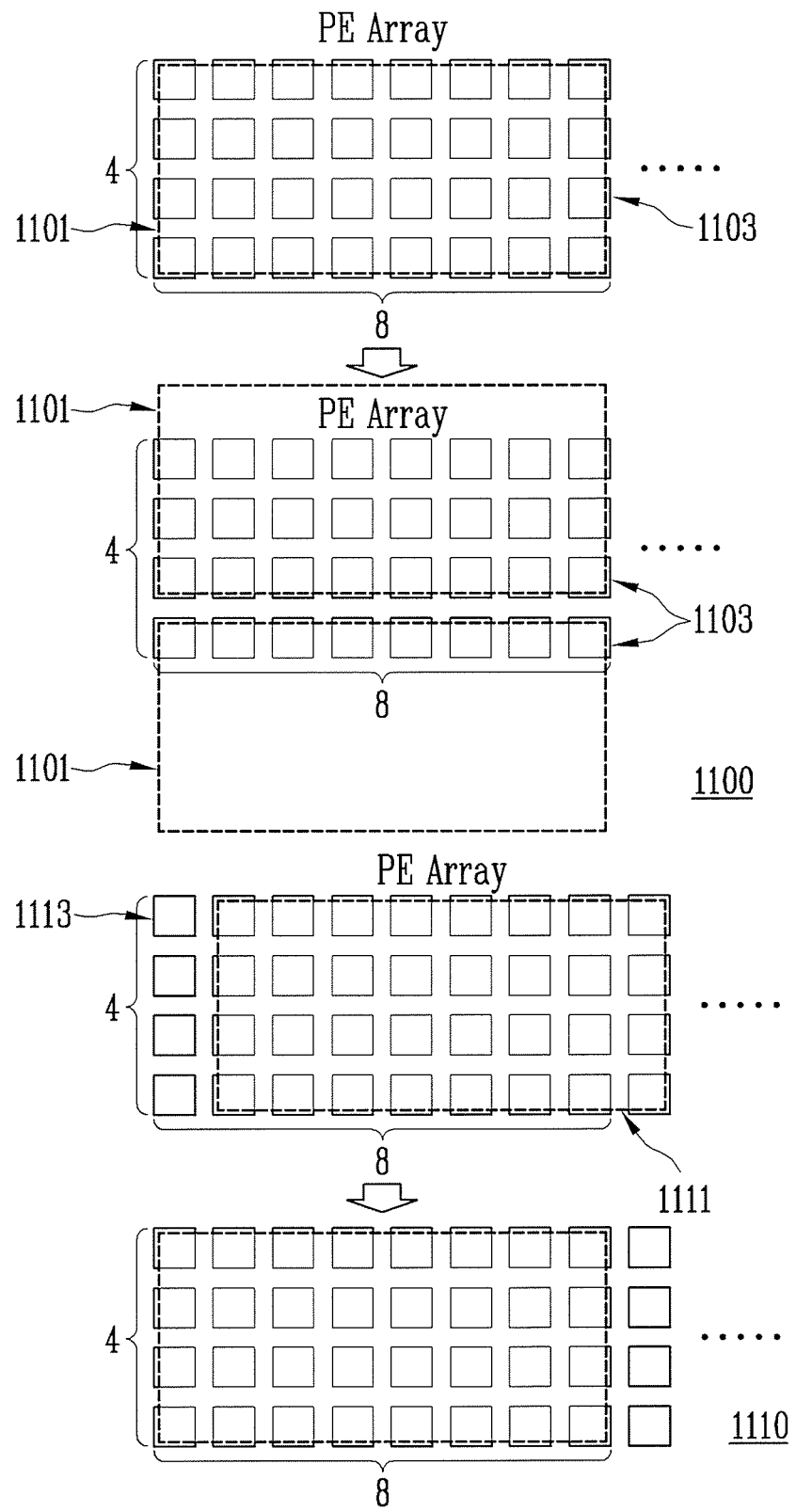
FIG. 11 illustrates a method of calculating a SAD while moving a search area.

FIG. 11 illustrates a method of calculating a SAD by moving a search area.

Referring to FIG. 11, a method, in which after the SAD of one current frame macroblock and one reference frame macroblock is calculated using the method described in FIG. 10, the current frame macroblock moves, is illustrated. As confirmed in FIG. 9, for the purpose of the SAD calculation, the current frame macroblock must move the entire reference frame search area in a unit of a pixel to calculate each SAD. However, the current frame macroblock may move the reference frame macroblock in an opposite direction of the current frame macroblock to calculate the SAD.

In this case, reference numeral 100 illustrates a method of updating PE data when the current frame macroblock moves in a column direction, and reference numeral 1110 illustrates a method of updating PE data when the current frame macroblock moves in a row direction.

In reference numeral 1100, a solid-lined rectangle array 1101 represents a section in charge of a first macroblock in a PE array, and each rectangle represents one PE. In addition, a rectangle in a dotted line 1103 represents a reference frame macroblock. When the SAD calculation is performed on the first macroblock, the reference frame macroblock moves by one pixel in an upward direction rather than moving the current frame macroblock by one pixel in a downward direction. That is, every PE in this area receives a new reference frame macroblock from a PE immediately below the PE array to replace the conventional reference macroblock data. Then, since a PE in the last row does not have a PE below, the corresponding data in the reference frame search area is read out from the local memory to be replaced.

In reference numeral 1110, a rectangle array in a dotted line 1111 represents a section in charge of a first macroblock in the PE array, and each rectangle represents one PE. Also, a rectangle in a solid line 1113 represents a reference frame macroblock. Calculating SADs of the first macroblock, one pixel of the reference frame macroblock is shifted in a left direction rather than shifting one pixel of the current frame macroblock in a right direction. That is, all PEs in this area receive new reference block data of 4 pixels from a PE to the immediate right of the PE array to replace the conventional reference frame macroblock data. Then, since a PE in the last column does not have a PE in the right side, the corresponding 4 pixel data in the reference frame search area is read out from the local memory to replace the conventional reference frame macroblock data.

Figure 12:
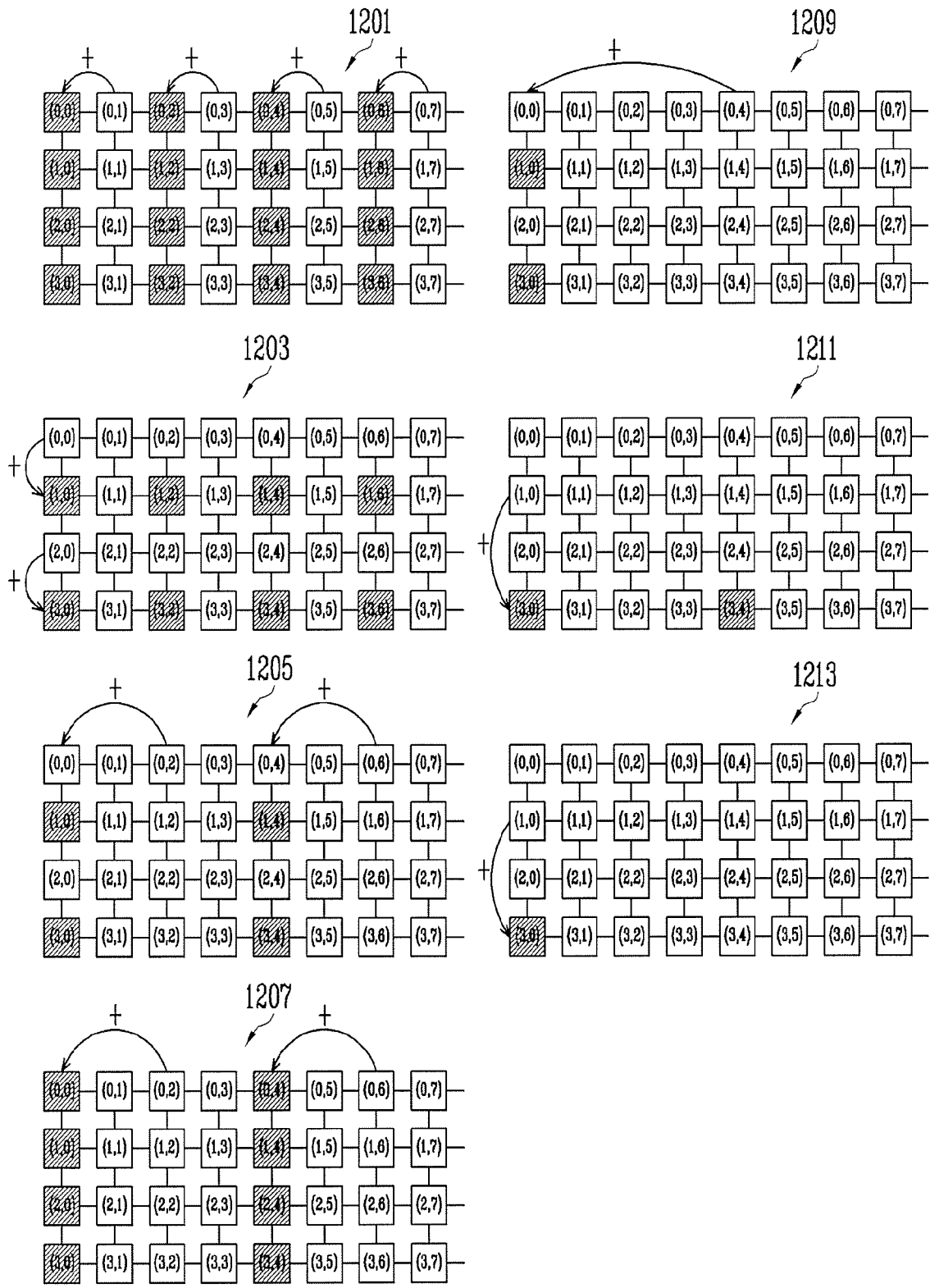
FIG. 12 illustrates a method of calculating a SAD value with respect to each variable block.

FIG. 12 illustrates a method of calculating a SAD value with respect to each variable block.

Referring to FIG. 12, a SAD value of a variable block is calculated while the SAD values with respect to each PE unit of a current frame macroblock are calculated in FIGS. 9 to 11. The variable block has 7 types as described with reference to FIG. 2, and calculates each SAD value.

Since the SAD value with respect to a 4×2 block is calculated by each PE in the previous process, each SAD value can be calculated based on the calculated value.

First, as illustrated in reference numeral 1201, a method of calculating a SAD value of a 4×4 block includes adding SAD values stored in even columns with SAD values stored in odd columns among SAD values stored in each PE to be stored in the odd columns. As a result, the SAD values of the 4×2 block in odd columns and the SAD values of the 4×2 block in even columns are added to each other, so that SAD values of a 4×4 block can be stored.

As illustrated in reference numeral 1203, SAD values of an 8×4 block can be calculated using the SAD values of the 4×4 block, which are determined in reference numeral 1201. This is calculated by adding up the PEs storing the SAD values in 1201 in a unit of a row, and storing the results in the even rows. Then, only PEs that store 8×4 SAD values obtained in 1203 are added up in a unit of a column to be stored in the odd columns, so that SAD values with respect to a 8×8 block can be obtained as illustrated in reference numeral 1205.

Furthermore, with respect to the PEs storing the 4×4 SAD values calculated in 1201, odd columns and even columns are summed up to be stored in the odd columns of the PEs, so that SAD values with respect to a 4×8 block can be stored as illustrated in reference numeral 1207.

Moreover, odd columns and even columns of PEs storing the 8×8 SAD values that are obtained in 1205 are added to be stored in the odd columns of the PEs, so that SAD values with respect to an 8×16 block can be stored as illustrated in reference numeral 1209.

In addition, odd rows and even rows of the PEs storing the 8×8 SAD values that are obtained in 1205 are added to be stored in the even rows of the PEs, so that SAD values with respect to a 16×8 block can be stored as illustrated in reference numeral 1211.

Finally, even rows and odd rows of PEs storing the SAD values of the 8×16 block that are obtained in 1209 are added to be stored in the even rows of the PEs, so that a SAD value with respect to a 16×16 block can be stored as illustrated in reference numeral 1213.

As described above, using the previously determined SAD values of the 4×2 block, a SAD value of a transformation block can be easily obtained using PE values included in the PE array unit.

Figure 13:
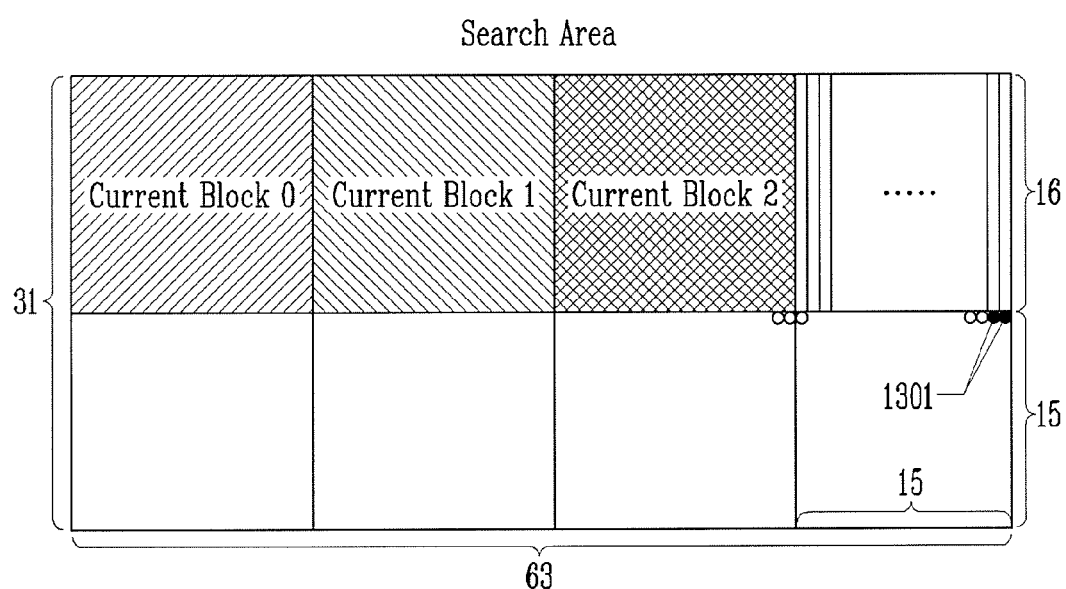
FIG. 13 illustrates a post-process of the SAD calculation according to the present invention.

FIG. 13 illustrates a post-process of the SAD calculation according to the present invention.

As described above, a PE array unit is divided into three (3) sections to parallelly calculate SAD values with respect to the three current frame macroblocks in the present invention. Here, a reference frame search area is maintained at the 31×63 pixel size, and when the current frame macroblock moves to perform the SAD calculation, and reaches the last part of the reference frame search area, there is no PE on the right side. In this case, as described in FIG. 11, pixel data corresponding to the area must be transferred from the local memory, and thus second pixel data must be transferred as illustrated in 1301.

As a result of the above process, the SAD calculation with respect to the current frame macroblock can be performed on the entire search area.

Figure 14:
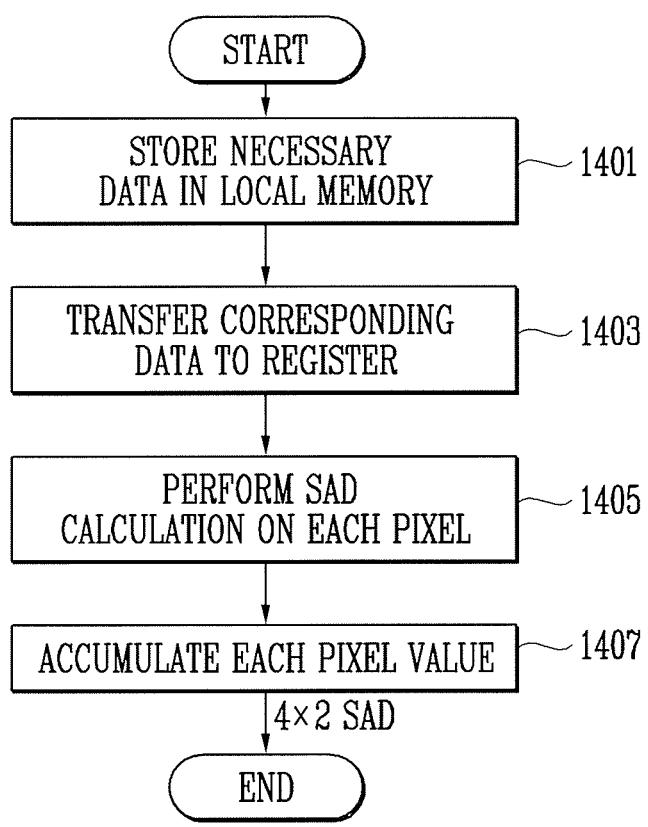
FIG. 14 is a flowchart illustrating a method of calculating a SAD value of a 4×2 block by each PE in a PE array unit of the present invention.
Figure 15:
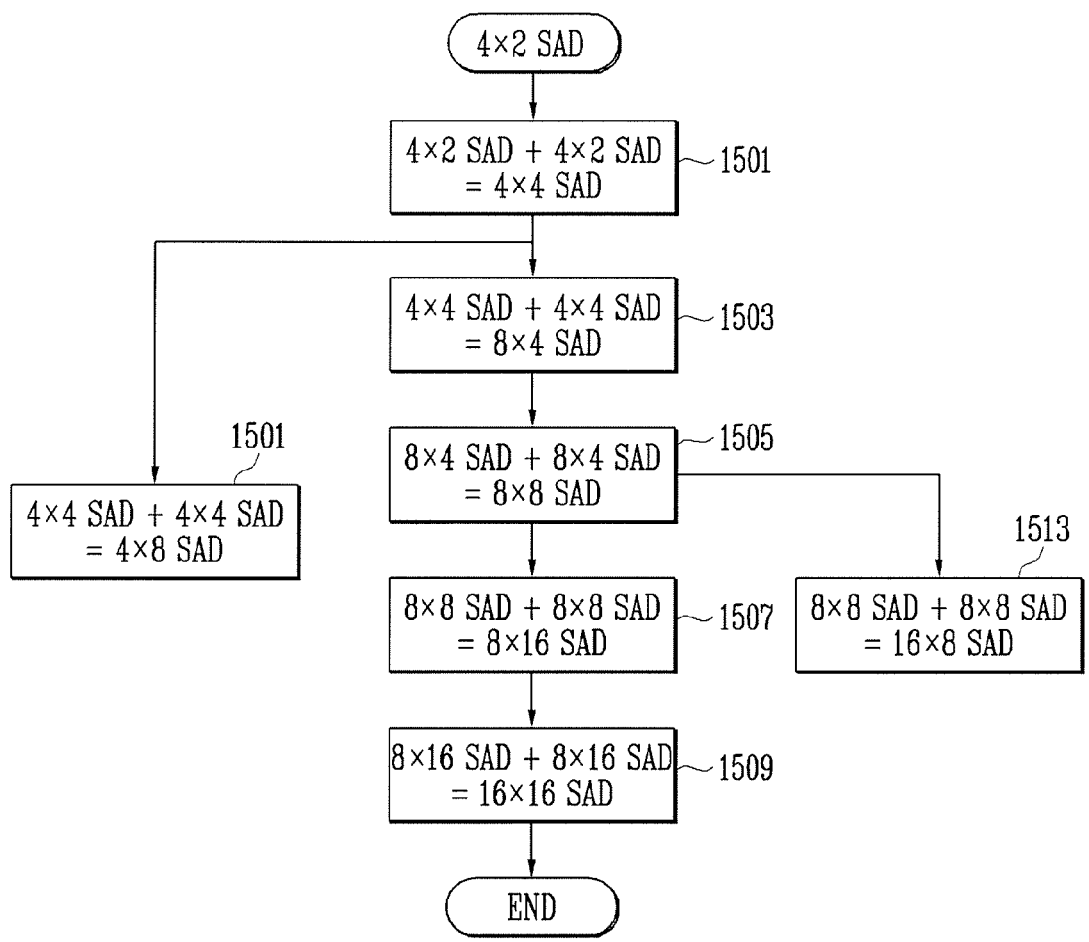
FIG. 15 is a flowchart illustrating a method of calculating a SAD value of a variable block using SAD values calculated by each PE.

FIGS. 14 and 15 are flowcharts illustrating a method of calculating a SAD according to the present invention.

FIG. 14 is a flowchart illustrating a method of calculating a SAD value of a 4×2 block by each PE in a PE array unit of the present invention.

Referring to FIG. 14, each PE stores data of a current frame macroblock and data of a reference frame search area into a local memory (step 1401). Then, data of the current frame macroblock and data of the reference frame search area, which correspond to each PE, are transferred to each register (step 1403). Afterwards, SAD values are calculated using the transferred data. That is, an absolute value of a difference between data of the current frame macroblock and data of the reference frame search area for each pixel is calculated (step 1405).

Sequentially, the SAD value of each pixel is accumulated, so that each PE calculates the SAD value of the 4×2 block (step 1407).

FIG. 15 is a flowchart illustrating a method of calculating a SAD value of a variable block using SAD values calculated by each PE.

Referring to FIG. 15, SAD values of PEs in an even column are sequentially added to SAD values of PEs in an odd column to be stored in the PEs in the odd column. That is, PEs in a first column and PEs of a second column are added together, and the results are stored in PEs of the first column, and PEs of a third column and PEs of a fourth column are added together, and the results are stored in the third column. Accordingly, SAD values of the 4×4 block can be stored in the PEs of the odd columns, i.e., the first column, the third column, the fifth column, and so on (step 1501).

Then, with respect to the PEs storing the obtained SAD values of the 4×4 block only, PEs in an even row and PEs in an odd row are added together, and the added results are stored in the PEs in the even row. That is, PEs in the first row and PEs in the second row are added together, and the results are stored in the PEs in the second row. Afterwards, SAD values of an 8×4 block can be stored in PEs in the second row, i.e., a second row and first column, a fourth row and first column, a second row and third column, a fourth row and third column, and so on (step 1503).

Then, with respect to the PEs storing the SAD values of the 8×4 block, PEs in an even column and PEs in an odd column are added together, and the added results are stored in the PE of the odd column. Accordingly, SAD values of an 8×8 block can be calculated (step 1505). Furthermore, with respect to the PEs storing the 8×8 SAD values, when PEs in an even column and PEs in an odd column are added together, and the added results are stored in the PEs in the odd column, SAD values of a 8×16 block can be stored (step 1507). Also, with respect to the calculated PEs, when PEs in an even row and PEs in an odd row are added together to be stored in the PEs in the even row, SAD values of a 16×16 block can be stored (step 1509).

Meanwhile, with respect to the PEs storing the SAD values of the 4×4 block in step 1501, when PEs in the even column and PEs in the odd column are added together, and the results are stored in the PEs in the odd column, SAD values of a 4×8 block can be stored (step 1511). With respect to the PEs storing the SAD values of the 8×8 block in step 1505, when PEs in the even row and PEs in the odd row are added together, and the results are stored in the PEs in the even row, the SAD value of a 16×8 block can be stored.

As a result of the above processes, SAD values of all variable blocks can be easily calculated.

The present invention is capable of providing an apparatus and method for calculating a Sum of Absolute Differences (SAD) for motion estimation of a variable block.

Also, according to the present invention, the SAD calculation is parallelly performed in parallel, so that its calculation can be efficiently performed and the SAD calculation can be performed in a short amount of time to significantly improve H.264 encoding efficiency.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A Sum of Absolute Difference (SAD) calculator for motion estimation of a variable block, comprising: a PE array unit including a plurality of Processing Elements (PEs) that aligned in the form of a matrix, and parallelly calculating a SAD values on a serial current frame macroblocks; a local memory storing current frame macroblock data, reference frame macroblock data, and reference frame search area data, the local memory being memory-mapped to each PE that is provided in the PE array unit; and a controller controlling SAD calculation of the PE array unit by providing the current frame macroblock data and the corresponding reference frame macroblock data stored in the local memory to registers of the corresponding PEs, wherein the PE array unit can calculate SAD values on 4×4, 4×8, 8×4, 8×4, 8×8, 8×16, 16×8 and 16×16 pixels of current macroblocks using SAD values on 4×2 pixels of the current frame macroblocks, the SAD values on 4×2 pixels being calculated, stored in the registers of the PEs and added together, wherein the PE array unit includes 4×24 PEs and parallelly calculate the SAD values on three macroblocks.

2. The calculator of claim 1, wherein the PE comprises:
a receiver for receiving macroblock data, reference frame macroblock data, and reference frame search area data from the local memory;
a register for storing the data received from the receiver; and
an Arithmetic Logic Unit (ALU) for calculating the SAD value using the stored data.

3. The calculator of claim 1, wherein the PE array unit is divided into at least four (4) sections, and performs partitioned Single Input stream Multiple Data stream (SIMD) calculation on each section.

4. The calculator of claim 1, wherein the PE of the PE array unit calculates the SAD using 4×2 pixel data of the current frame macroblock data and of the reference frame macroblock data, which are provided in the local memory.

5. A method of calculating a Sum of Absolute Difference (SAD) for motion estimation of a variable block, comprising: storing current frame macroblock data, reference frame macroblock data, and reference frame search area data in a local memory , the local memory being memory-mapped to each Processing Element (PE) of a PE array unit in which the PE array unit includes a plurality of PEs that are aligned in a form of a matrix; calculating parallelly SAD values on a series current frame macroblocks; and controlling SAD calculations of the PE array unit by providing the current frame macroblock data and the corresponding reference frame macroblock data stored in the local memory to registers of the corresponding PEs, wherein the PE array unit can calculate SAD values on 4×4, 4×8, 8×4, 8×4, 8×8, 8×16, 16×8 and 16×16 pixels of current macroblocks using SAD values on 4×2 pixels of the current frame macroblocks, the SAD values on 4×2 pixels being calculated, stored in the registers of the PEs and added together, wherein the PE array unit includes 4×24 PEs and the SAD values are parallelly calculated on three macroblocks.

6. The method of claim 5, wherein the PE is a basic unit that calculates a SAD value of at least one pixel provided in the current frame macroblock.

7. The method of claim 5, wherein the PE array, in which the PE consists of 4 rows and 24 columns, calculates a SAD value of a pixel provided in each different current frame macroblock of every 8 columns out of the 24 columns.

8. The method of claim 5, wherein the SAD value of the current frame macroblock is calculated while shifting by one pixel in a rightward direction from upper-left to lower-right in the reference frame search area.

9. The method of claim 5, wherein the PE array divides a PE provided in the PE array into at least 4 sections, and performs partitioned SIMD calculation on each section.

10. The method of claim 5, wherein each PE in the PE array calculates the SAD using 4×2 pixel data of the current frame macroblock data and the reference frame macroblock data, which are provided in the local memory.

11. The method of claim 5, wherein the calculating the SAD value of the variable block using the calculated SAD of each PE comprises adding up each SAD value stored in each PE to correspond to a variable block size, so that the SAD value of the variable block is calculated.

12. The method of claim 5, wherein the variable block has block sizes of 4×4, 4×8, 8×4, 8×8, 16×8, 8×16, and 16×16 pixels.

13. A non-transient computer readable recording media (CRRM) having written thereon coded instructions programmed to carry out a method of calculating a Sum of Absolute Difference (SAD) for motion estimation of a variable block, the coded instructions of the CRRM comprising: coded instructions for storing current frame macroblock data, reference frame macroblock data, and reference frame search area data in a local memory , the local memory being memory-mapped to each Processing Element (PE) of a PE array unit in which the PE array unit includes a plurality of PEs that are aligned in a form of a matrix; coded instructions for calculating parallelly SAD values on a series current frame macroblocks; and coded instructions for controlling SAD calculations of the PE array unit by providing the current frame macroblock data and the corresponding reference frame macroblock data stored in the local memory to registers of the corresponding PEs, wherein the PE array unit can calculate SAD values on 4×4, 4×8, 8×4, 8×4, 8×8, 8×16, 16×8 and 16×16 pixels of current macroblocks using SAD values on 4×2 pixels of the current frame macroblocks, the SAD values on 4×2 pixels being calculated, stored in the registers of the PEs and added together, wherein the PE array unit includes 4×24PEs and the SAD values are parallelly calculated on three macroblocks.

14. The CRRM of claim 13, wherein the PE is a basic unit that calculates a SAD value of at least one pixel provided in the current frame macroblock.

15. The CRRM of claim 13, wherein the PE array, in which the PE consists of 4 rows and 24 columns, calculates a SAD value of a pixel provided in each different current frame macroblock of every 8 columns out of the 24 columns.

16. The CRRM of claim 13, wherein the SAD value of the current frame macroblock is calculated while shifting by one pixel in a rightward direction from upper-left to lower-right in the reference frame search area.

17. The CRRM of claim 13, wherein the PE array divides a PE provided in the PE array into at least 4 sections, and performs partitioned SIMD calculation on each section.

* * * * *